(12) United States Patent
Perkins et al.

(10) Patent No.: US 7,472,269 B2
(45) Date of Patent: Dec. 30, 2008

(54) SYSTEM AND METHOD FOR STRONG AUTHENTICATION ACHIEVED IN A SINGLE ROUND TRIP

(75) Inventors: Charles E. Perkins, Saratoga, CA (US); Hossam Afifi, Evry (FR)

(73) Assignee: Nokia Siemens Networks Oy, Espoo (FI)

( * ) Notice: Subject to any disclaimer, the term of this patent is extended or adjusted under 35 U.S.C. 154(b) by 1150 days.

(21) Appl. No.: 10/083,448

(22) Filed: Feb. 25, 2002

(65) Prior Publication Data

US 2002/0178358 A1 Nov. 28, 2002

Related U.S. Application Data (60) Provisional application No. 60/271,143, filed on Feb. 23, 2001.

(51) Int. Cl.
*H04L 9/32* (2006.01)
(52) U.S. Cl. .............. 713/155; 380/258; 726/4
(58) Field of Classification Search .......... 713/159, 713/168, 172–176, 201, 155; 726/4; 380/259
See application file for complete search history.

(56) References Cited

U.S. PATENT DOCUMENTS

| | | | |
|---|---|---|---|
| 5,729,537 A | 3/1998 | Billström | 370/329 |
| 5,794,139 A | 8/1998 | Mizikovsky et al. | |
| 5,887,251 A * | 3/1999 | Fehnel | 455/411 |
| 6,061,346 A | 5/2000 | Nordman | 370/352 |
| 6,463,055 B1 * | 10/2002 | Lupien et al. | 370/353 |
| 6,594,489 B2 * | 7/2003 | Holcman | 455/432.1 |
| 6,678,281 B1 * | 1/2004 | Chakrabarti et al. | 370/438 |
| 6,769,000 B1 * | 7/2004 | Akhtar et al. | 707/103 R |
| 6,894,994 B1 * | 5/2005 | Grob et al. | 370/335 |
| 2002/0102964 A1 | 8/2002 | Park | |
| 2002/0120844 A1 * | 8/2002 | Faccin et al. | 713/168 |

FOREIGN PATENT DOCUMENTS

CN 1266341 A 9/2000

OTHER PUBLICATIONS

Marcovici et al. ("Global Authentication," Lucent Technologies TIA TR-45 Committee white paper, Nov. 1999), pp. 1-9.*

* cited by examiner

*Primary Examiner*—Andrew L Nalven
(74) *Attorney, Agent, or Firm*—Squire, Sanders & Dempsey, LLP (57) ABSTRACT

A system and method for strong authentication achieved in a single round trip is disclosed, which reduces the amount of time needed for a mobile node to be authenticated by the network. In an embodiment of the present invention, the, authentication time is approximately three times faster than for 3GPP.

20 Claims, 5 Drawing Sheets

SYSTEM AND METHOD FOR STRONG AUTHENTICATION ACHIEVED IN A SINGLE ROUND TRIP

RELATED APPLICATION

This application claims the benefit of U.S. Provisional Application No. 60/271,143 filed Feb. 23, 2001, the benefit of the earlier filing date of which is hereby claimed under 35 U.S.C. §119 (e).

FIELD OF THE INVENTION

The present invention relates to mobile networks, and more particularly to authentication in for mobile networks.

BACKGROUND OF THE INVENTION

Mobile IP enables a mobile node to move freely from one point of connection to another. During the movement of the mobile node from one connection point to another there should be no disruption of the TCP end-to-end connectivity. In order to extend Mobile IP for use by cellular telephone companies and check the mobile node's identity, an authentication, authorization, and accounting ("AAA") mechanism may be used. AAA may be used to provide the authentication of a mobile node ("MN") when mobile node is connected to the point of the agent on the foreign domain (foreign agent).

Authentication in 3GPP and GSM is typically done by first asking the identity of the mobile node to the network. The mobile node sends an attach request to the foreign domain's MSC or SGSN or 3GSGSN. The 3GSGSN asks the identity of the mobile node to the home authentication server (the HLR). When the identity is verified, the SGSN asks for authentication quintuplets or triplets in GSM. When the SGSN receives the quintuplets or triplets it sends an authentication request to the mobile node. The mobile node uses its local algorithms to sign the random number received in the quintuplet from the SGSN. The mobile node may then verify the network identity when in 3GPP and send back a signature to the visited SGSN. The foreign SGSN verifies the signature by comparing it to the expected result received in the quintuplet. When this matches, then the three entities (the mobile node, the foreign authentication server and the home authentication server) are authenticated and trust each other.

This authentication process, however, requires many steps and communications from the foreign domain to the home domain. Not only is this time consuming, but the communications may be costly.

SUMMARY OF THE INVENTION

The present invention is directed at addressing the above-mentioned shortcomings, disadvantages and problems, and will be understood by reading and studying the following specification.

According to aspects of the invention, a system and method for strong authentication in a single round trip within a GPRS network is disclosed, which reduces the amount of time needed for a mobile node (MN) to be authenticated by the network.

According to an aspect of the invention, a random number is generated by the base station in the foreign network. The random number may be sent directly to the MN or the random number may be broadcast on a common channel. The MN receives the random number generated at the base station much faster as compared to a random number generated by the home domain.

According to another aspect of the invention, the MN generates a signature using the random number to authenticate itself to the network. Any algorithm for signature generation may be used. The home authentication server (AAAH), typically the HLR, authenticates the signature. When the signature is authenticated, the AAAH generates a signature to authenticate the network to the MN. The AAAH sends this signature to the MN. When the MN authenticates the signature, strong authentication has occurred.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a network element, such as a router. The term support node refers to both "GGSN" and "SGSN" nodes. The term "user" refers to any person or customer such as a business or organization that employs a mobile node to communicate or access resources over a mobile network. The term "operator" refers to any technician or organization that maintains or services an IP based network. The term "AAA" refers to authentication, authorization, and accounting. The term "AAAH" refers to a home domain AAA server for a mobile node. The term "AAAF" refers to a foreign domain AAA server relative to a mobile node. The term "HA" refers to a home agent. The term "FA" refers to a foreign agent. The term "home agent" refers to a node, such as a router, on the home network which serves as the point of communications with the mobile node. The term "foreign agent" refers to a node, such as a router, on the mobile node's point of attachment when it travels to a foreign network. The term "HLR" refers to a home location register. The term "VLR" refers to visitor location register. The term "MN" refers to a mobile node.

Referring to the drawings, like numbers indicate like parts throughout the views. Additionally, a reference to the singular includes a reference to the plural unless otherwise stated or is inconsistent with the disclosure herein.

Illustrative Operating Environment

Figure 1:
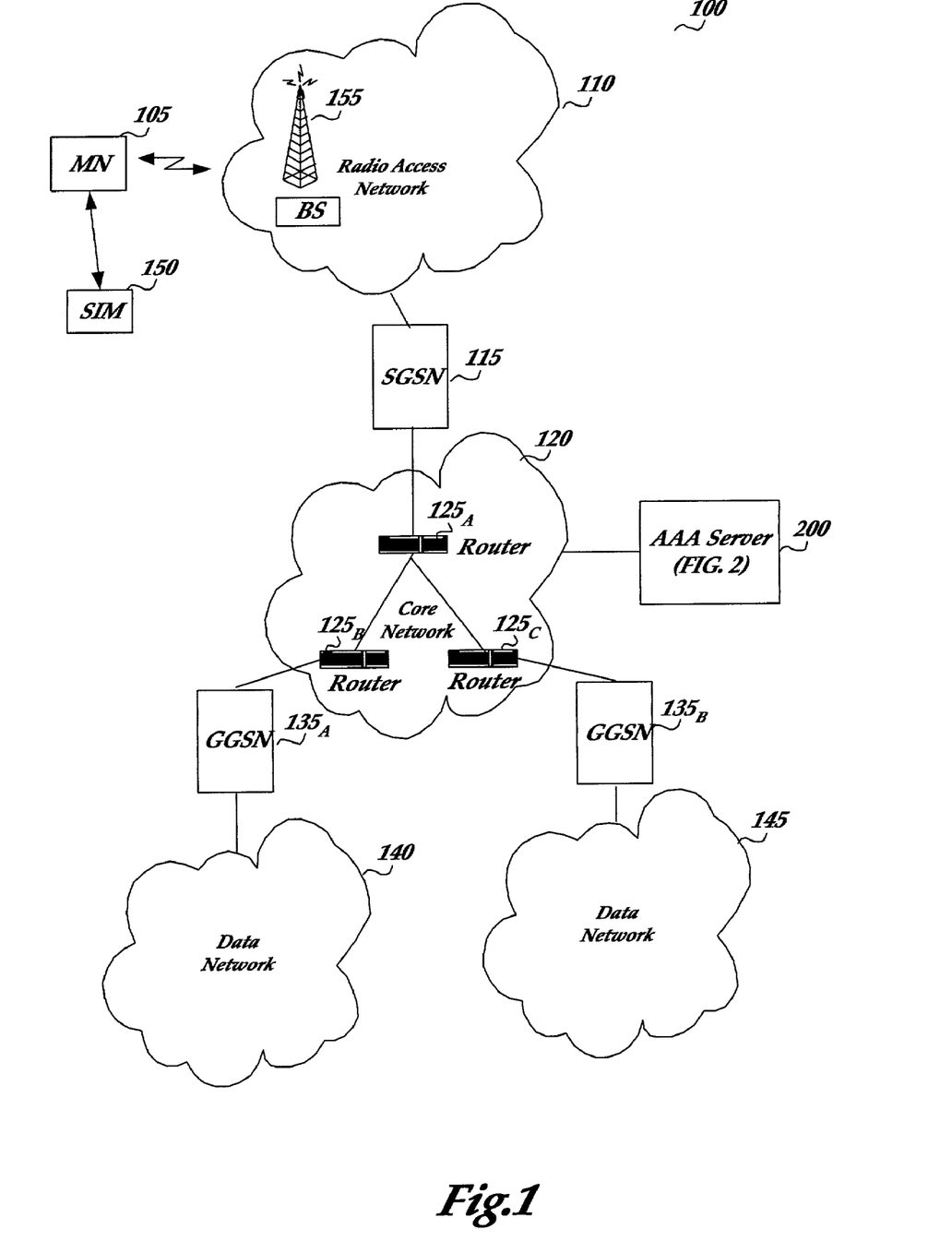
FIG. 1 illustrates an exemplary mobile IP network in which the invention may operate.

With reference to FIG. 1, an exemplary mobile IP network in which the invention may operate is illustrated. As shown in the figure, mobile IP network 100 includes mobile node (MN) 105, SIM 150, radio access network 110, base station (BS) 155, Serving GPRS Support Node (SGSN) 115, core network 120, routers 125$_{A-C}$, AAA server 200, General Packet Radio Service Nodes (GGSNs) 135$_{A-B}$, data network 140, and data network 145.

The connections and operation for mobile IP network 100 will now be described. MN 105 is coupled to radio access network 110. Generally, MN 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. MN 105 may also include other devices that have a wireless interface such as Personal Digital Assistants (PDAs), handheld computers, personal computers, multiprocessor systems, microprocessor-based or programmable consumer electronics, network PCs, wearable computers, and the like. As illustrated, MN 105 is coupled to Subscriber Identity Module (SIM) 150. SIM 150 is a smart card that may be used in MN 105 to store information. This information may include a key that is only known to MN 105 and the home authority to which the user belongs. A User Services Identity Module (USIM) or other software/hardware may also be used to provide the same functionality. The secret key is used for authenticating MN 105. For example, the secret key that is stored in SIM 150 and is associated with MN 105 is used for authentication when MN 105 is roaming and is not within its home authority. SIM 150 may also store algorithms to generate a signature used for authentication as well as other data.

Radio access network (RAN) 110 transports information to and from devices capable of wireless communication, such as MN 105. Radio access network 110 may include both wireless and wired components. For example, radio access network 110 may include a cellular tower that is linked to a wired telephone network. Typically, the cellular tower carries communication to and from cell phones, pagers, and other wireless devices, and the wired telephone network carries communication to regular phones, long-distance communication links, and the like. As shown in the figure, RAN 110 includes BS 155 that is arranged to receive signals from MN 105 and send signals to MN 105. Depending on the specific architecture of the mobile network a base station controller (BSC) or radio network controller (RNC) may also be coupled to BS 155. Generally, the BSC/RNC manages advanced radio-related functions, handovers from one cell to another, radio channel assignments, Quality of Service (QoS) issues, load-balancing, and the like.

Some nodes may be GPRS nodes. For example, SGSN 115 may send and receive data from mobile stations, such as MN 105, over radio access network 110. SGSN 115 also maintains location information relating to MN 105. SGSN 115 communicates between MN 105 and GGSNs 135$_{A-B}$ through core network 120.

Core network 120 is an IP packet based backbone network that includes routers, such as routers 125$_{A-C}$, to connect the support nodes in the network. Some of the routers may act as a HA or a FA for a MN. Generally, an agent (HA or FA) communicates with AAA server 200 to maintain a secure connection with the mobile node. Routers are intermediary devices on a communications network that expedite message delivery. On a single network linking many computers through a mesh of possible connections, a router receives transmitted messages and forwards them to their correct destinations over available routes. On an interconnected set of LANs, including those based on differing architectures and protocols, a router acts as a link between LANs, enabling messages to be sent from one to another. Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links.

GGSNs 135$_{A-B}$ are coupled to core network 120 through routers 125$_{A-C}$ and act as wireless gateways to data networks, such as network 140 and network 145. Networks 140 and 145 may be the public Internet or a private data network. GGSNs 135$_{A-B}$ allow MN 105 to access network 140 and network 145.

AAA server 200 is coupled to core network 120 through communication mediums. AAA server 200 may be programmed by an operator to contain the authentication, authorization, and accounting rules associated with the operator's network. AAA server 200 may be programmed differently under different operator's networks. AAA server 200 may also be programmed such that is can communicate with foreign AAA servers (not shown).

Utilizing an AAA server helps to enforce authentication, authorization, and accounting rules to help ensure end-to-end quality of service (QoS) for users. Operators have the flexibility to provide different AAA rules. For example, conversational traffic may be mapped into either the Expedited Forwarding (EF) class or Assured Forwarding (AF) class at the core network. The operator may employ a different charging structure for each class. Also, AAA rules may be established between a foreign authority and a home authority. An exemplary AAA server is described in more detail in conjunction with FIG. 2.

Furthermore, computers, and other related electronic devices may be connected to network 140 and network 145. The public Internet itself may be formed from a vast number of such interconnected networks, computers, and routers. Mobile IP network 100 may include many more components than those shown in FIG. 1. However, the components shown are sufficient to disclose an illustrative embodiment for practicing the present invention.

The media used to transmit information in the communication links as described above illustrates one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
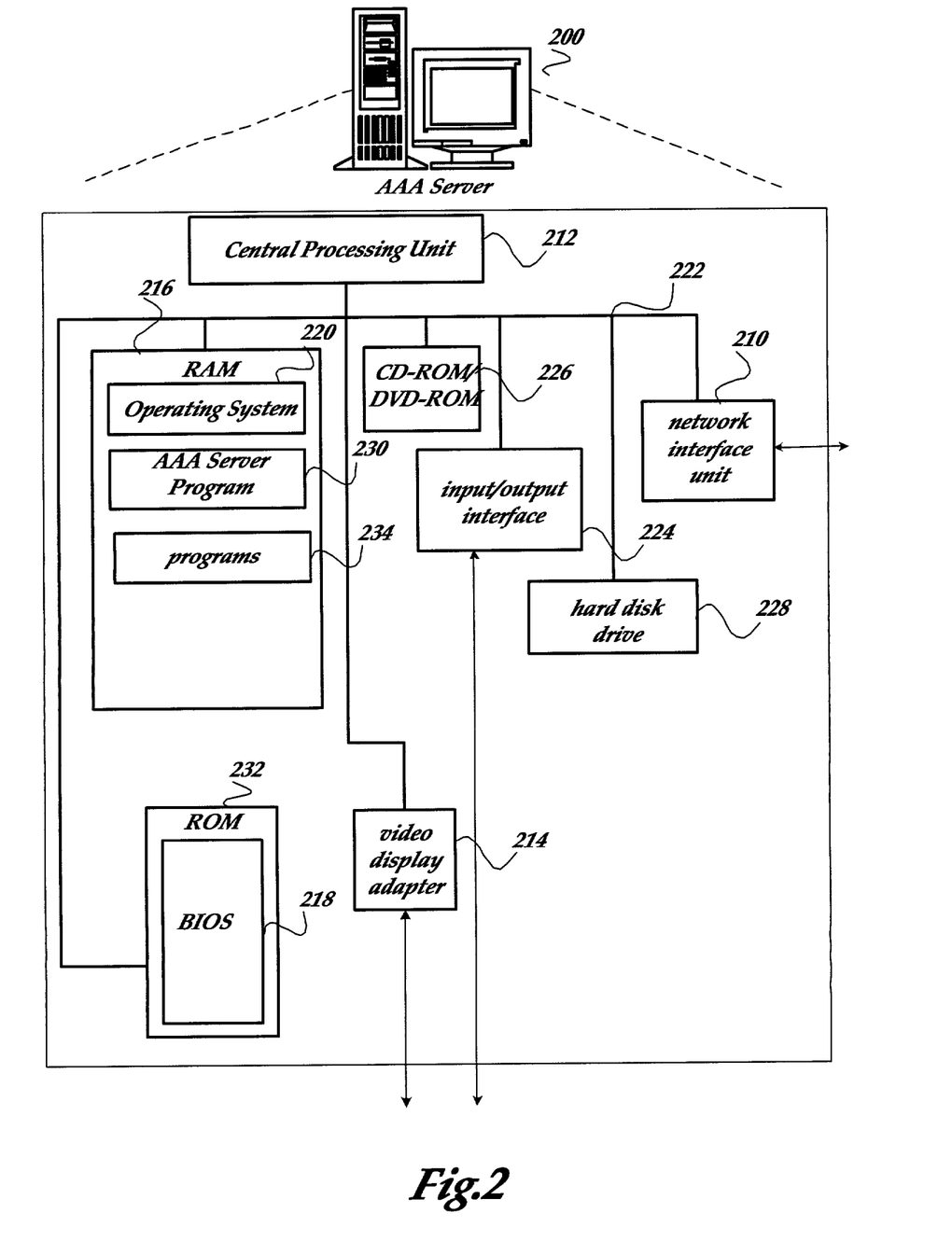
FIG. 2 is a schematic diagram that shows an exemplary AAA server that is operative to provide authentication, authorization, and accounting rules.

FIG. 2 is a schematic diagram that shows an exemplary AAA server that is operative to provide authentication, authorization, and accounting rules. Accordingly, AAA server 200 may receive and transmit data relating to the AAA rules and authentication procedures. For instance, AAA server 200 may transmit AAA rules and receive data from the nodes on the mobile IP network.

AAA server 200 may include many more components than those shown in FIG. 2. However, the components shown are sufficient to disclose an illustrative embodiment for practicing the present invention. As shown in FIG. 2, AAA server 200 is connected to core network 120, or other communications network, via network interface unit 210. Network interface unit 210 includes the necessary circuitry for connecting AAA server 200 to core network 120, and is constructed for use with various communication protocols including the Common Open Policy Services (COPS) protocol that runs on top of the Transmission Control Protocol (TCP). Other communications protocols may be used, including, for example, User Datagram Protocols (UDP). Typically, network interface unit 210 is a card contained within AAA server 200.

AAA server 200 also includes processing unit 212, video display adapter 214, and a mass memory, all connected via bus 222. The mass memory generally includes RAM 216, ROM 232, and may include one or more permanent mass storage devices, such as hard disk drive 228, a tape drive, CD-ROM/DVD-ROM drive 226, and/or a floppy disk drive. The mass memory stores operating system 220 for controlling the operation of policy server 200. This component may comprise a general purpose server operating system 220 as is known to those of ordinary skill in the art, such as UNIX, LINUX™, or Microsoft WINDOWS NT®. Basic input/output system ("BIOS") 218 is also provided for controlling the low-level operation of AAA server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for AAA server program 230, and programs 234. AAA server program 230 includes computer executable instructions which, when executed by AAA server computer 200, maintain authentication, authorization, and accounting rules and procedures. AAA server 200 may include a JAVA virtual machine, an HTTP handler application for receiving and handing HTTP requests, JAVA applets for transmission to a WWW browser executing on a client computer, an IPsec handler, a Transport Layer Security (TLS) handler and an HTTPS handler application, and a secure protocol AAA handler, for handling secure connections.

AAA server 200 also comprises input/output interface 224 for communicating with external devices, such as a mouse, keyboard, scanner, or other input devices not shown in FIG. 2. Likewise, AAA server 200 may further comprise additional mass storage facilities such as CD-ROM/DVD-ROM drive 226 and hard disk drive 228. Hard disk drive 228 is utilized by AAA server 200 to store, among other things, application programs, databases, and program data used by AAA server program 230. For example, AAA rules, user databases, relational databases, and the like, may be stored.

Authentication in a Single Round Trip

Figure 3:
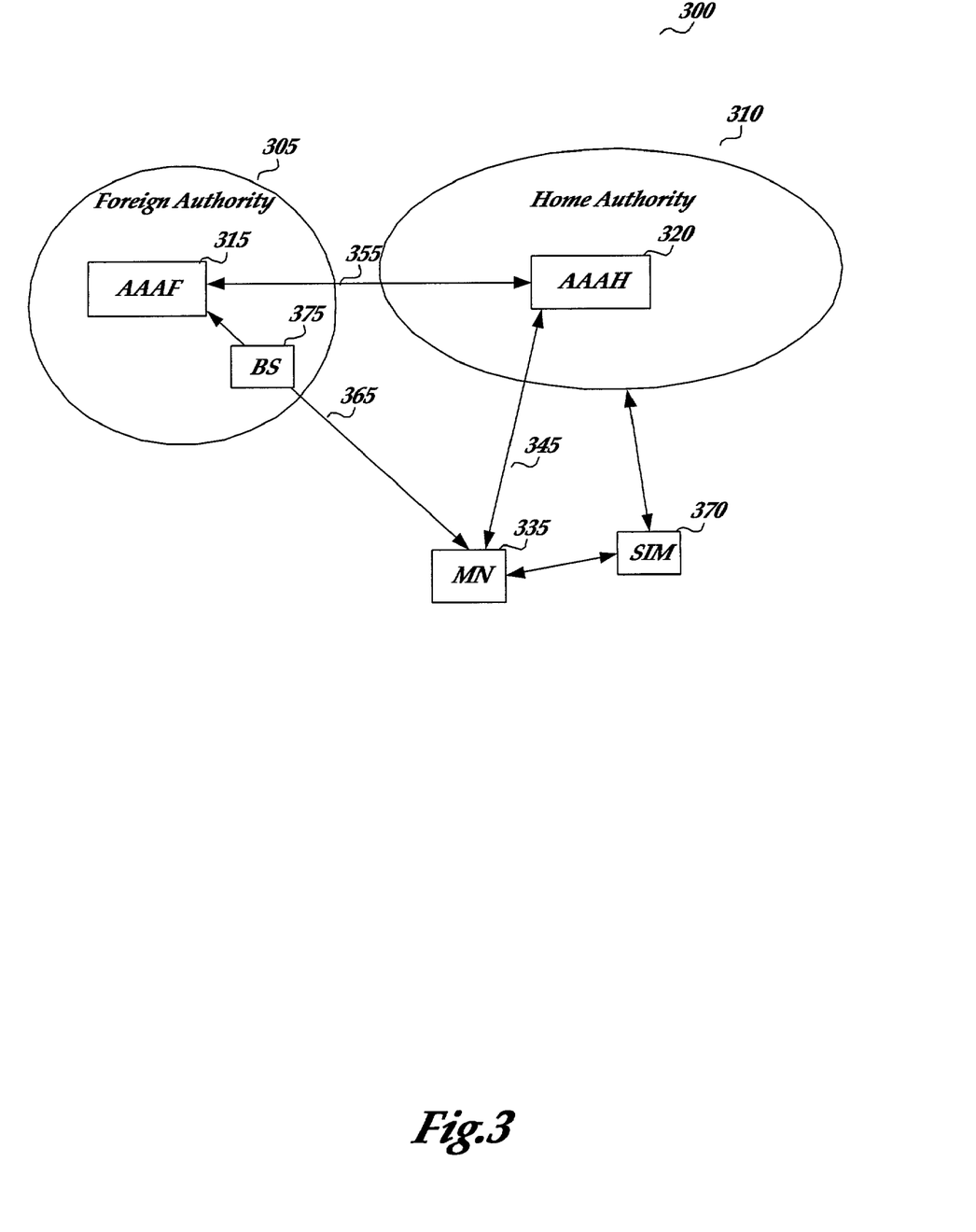
FIG. 3 illustrates a mobile IP/AAA model.

FIG. 3 illustrates a mobile IP/AAA model, in accordance with aspects of the invention. As shown in the figure, IP/AAA trust model 300 includes foreign authority 305, home authority (310), mobile node 335, AAAF 315, AAAH 320, and SIM 370, and base station (BS) 375.

Connections may be established between the MN, AAAH, and AAAF nodes to help ensure secure communication. SIM 370 is coupled to MN 335 and to home authority 310. SIM 370 is used to store a secret key that is used to authenticate MN 335. The secret key is only known to the home authority and to the MN. Additionally, SIM 370 may store algorithms to create a signature as well as keep track of counters relating to the MN to support authentication. SIM 370 may also be a USIM or some other software/hardware device.

In order to authenticate mobile nodes while roaming, a model, as shown in FIG. 3, may be used. In this exemplary figure, MN 335 belongs to home authority, or home domain 310 within a GPRS network. An authority is able to validate a user's credentials and is used to maintain and establish security relationships with authorities that are external to the mobile node's home network. The authority may be a single node, such as a computer or router, on the network, or the authority may include several nodes that are used to make up the authority. Connection 355 between AAAF 315 and AAAH 320 may be arranged to handle the authentication, authorizations, and possibly the accounting data, between home authority 310 and foreign authority 305. Connection 365 may be established between AAAF 315 and MN 335. Connections within a single domain may be achieved by local management or static configuration. However, secure connections, or authentications for a MN in a foreign authority is more difficult as there may be many hops between the AAAF and the AAAH. Additionally, a secure association does not typically exist between AAA's located within different authorities.

When MN 335 moves from home authority 310 to foreign authority 305, MN 335 an authentication process begins. The authentication of MN 335 is achieved in a single round trip from MN 335 to AAAF 315 to AAAH 320 and back. The system and method for strong authentication achieved in a single round trip has many advantages. For example, the time required for authentication of a mobile node is faster than when using traditional methods. MN 335 receives a random number that it uses to generate a signature. The algorithm used for the signature generation could be any algorithm. An example of such an algorithm is the one used in the 3GPP recommendation 3GPP TS 33.102 V3.6.0 (2000-10) Technical Specification $3^{rd}$ Generation Partnership Project. According to one embodiment, base station 375 associated with foreign authority 305 sends the random number to mobile node 335 when MN 335 is roaming in foreign authority 305. By generating the random number at the base station local to MN 335, the random number is received much faster by the MN than having to wait for it to be generated in home authority 310. This results in a significant time reduction for a MN that frequently roams. A unicast connection established between the mobile node and base station may be used to send the random number or the mobile node may receive the random number from a broadcast message. When the signature is prepared, MN 335 sends the signature to AAAF 315. Any algorithm for signature generation may be used. AAAF 315 forwards the signature to AAAH 320. According to one embodiment, the home location register (HLR) receives the signature. AAAH 320 authenticates the signature by comparing the identity of MN 335 to the signature received. When the signature is not authentic, the authentication process fails. When the signature is authentic, AAAH 320 prepares its own signature which is used to verify the network to MN 335. AAAH 320 sends the signature to AAAF 315. Along with the signature, AAAH 320 can proceed as in the 3GPP specification and return a set of quintuplets for further authentications. AAAF 315 forwards the signature to MN 335 for authentication. MN 335 then authenticates the signature prepared by AAAH 320. When the signature is not authentic, the authentication process fails. When the signature is authentic, a strong authentication has occurred. Strong authentication is achieved when the signature created by MN 335 is authenticated by AAAH 320 and when the signature created by AAAH 320 is authenticated by MN 335.

Strong authentication achieved in a single round trip has many advantages. The time required for authentication of a mobile node is faster than when using traditional methods. Also, network messages are reduced, thereby reducing cost. Authentication is also achieved in a single round trip.

Figure 4:
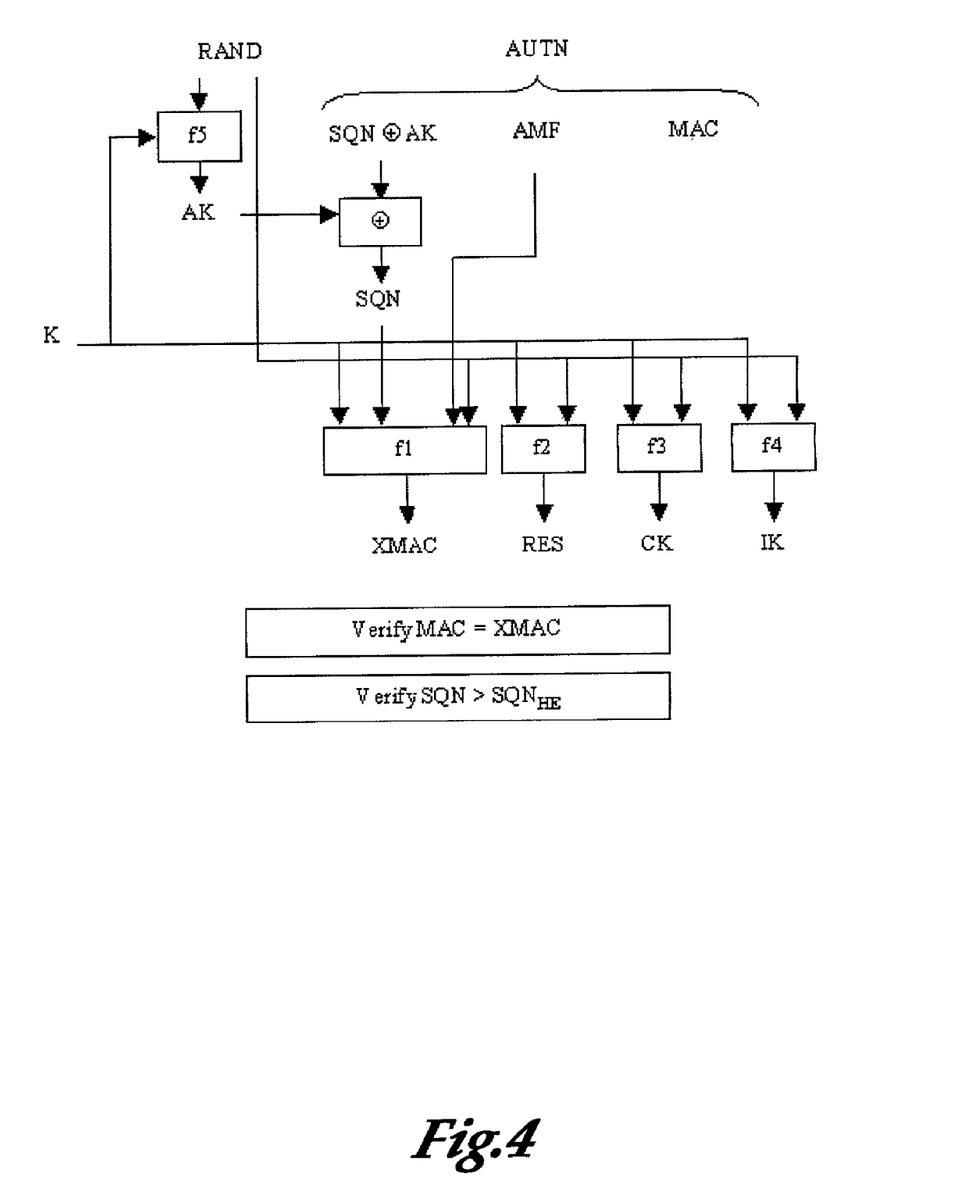
FIG. 4 illustrates authentication functions.

FIG. 4 illustrates authentication functions. Once the random number RAND is generated it is used by the MN and the home authentication server (AAAH) to generate a set of variables including a ciphering key (CK), an integrity check key (IK) a signature response (RES) and the authentication token AUTN which is used to authenticate the network to the MN. AUTN is based on the secret key K common to the MN and the AAAH and a sequence number SQN. The authentication vector may include a random number RAND, the authentication part AUTN, an expected result part XRES, key CK, and key IK. K is the secret key stored locally in the SIM card (USIM) associated with the MN. As mentioned previously, the MN and the AAAH use the same secret key for authentication. SQN is a sequence number. AK is an anonymity key.

Functions f1-f5 are keyed one way functions that are used to produce authentication data and key material for confidentiality and integrity. Functions f1-f5 each have an input coupled to key K and an input coupled to random number RAND. Function f1 also includes an input for sequence SQN and authentication management field (AMF). Function f1 produces the expected message authentication code (XMAC). Function f2 produces response RES. Function f3 produces cipher key CK. Function f4 produces integrity key IK. Function f5 produces anonymity key AK. As mentioned above, the AAAH may send the authentication vectors AV (quintuplets which is the equivalent of a GSM "triplet") to the MN.

The computed RES value may be compared with the XRES value included in an authentication vector to determine if the AKA exchange was successful. Sequence number SQN is a synchronized counter between the MN and the AAAH. By using this synchronized SQN and other parameters the AAAH can compute using function f1 a MAC value that can be checked by the USIM associated with the MN. This way the USIM authenticates that the secret key K, known only by the home authority and the MN, was used when constructing AUTN. The AMF field may be used to carry information about the used AKA algorithms and used secret key K if there are several. The AK is used to conceal the sequence number as the sequence number if not keyed may expose the identity and location of the user.

In the network authentication process the expected message authentication code (XMAC) is first computed and compared to the received message authentication code (MAC). When XMAC equals MAC and the sequence number is fresh ($SQN > SQN_{HE}$) the network authentication is successful. To compute the XMAC value the encrypted Sequence Number SQN is first recovered. After this, function f1 is used to compute XMAC from K, SQN, AMF and RAND.

In the process used to authenticate USIM to the network, response value RES is computed from RAND and K using function f2. Resulting RES value is then transmitted to the network. Used CK and IK are computed from RAND and K using functions f3 and f4 respectively. Actual encryption over the air link may be performed using a stream cipher mode of a block cipher KASUMI with ciphering key CK.

Figure 5:
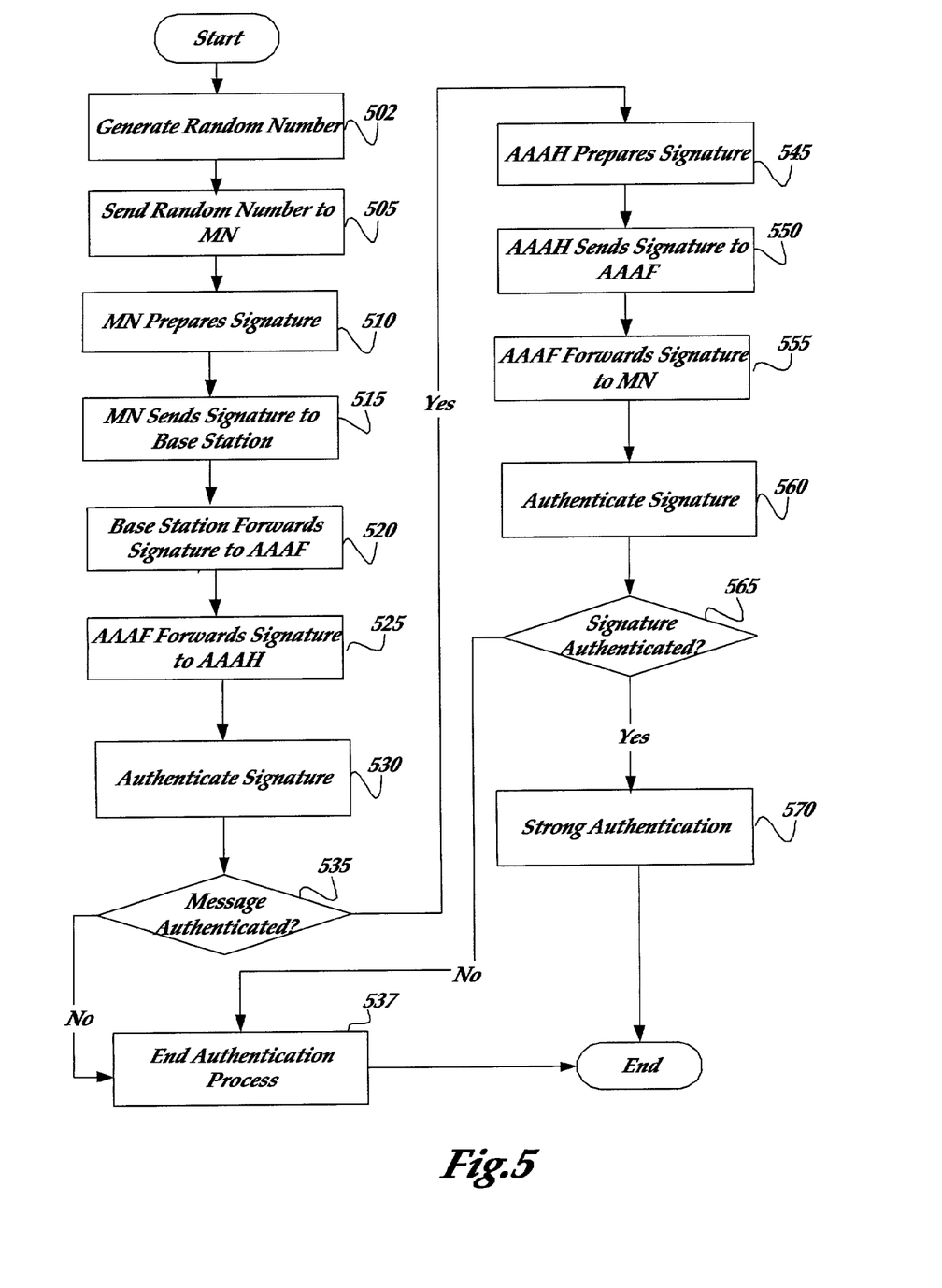
FIG. 5 shows a process for a single round trip authentication, in accordance with aspects of the invention.

FIG. 5 shows a process for a single round trip authentication within a GPRS network. After a start block, the process moves to block 502 where a random number is generated. According to one embodiment, the random number is generated in the local authority relative to the MN. Moving to block 505, the random number is sent to a mobile node. According to one embodiment, the base station sends the random number to the mobile node. A unicast connection established between the mobile node and base station may be used to send the random number or the mobile node may receive the random number from a broadcast message. Stepping to block 510, the mobile node prepares a signature relating to the random number. Any algorithm for signature generation may be used. Transitioning to block 515, the MN sends the signature to the base station from which it received the random number. Flowing to block 520, the base station forwards the signature to its associated AAAF. Moving to block 525, the AAAF forwards the signature to the MN's AAAH. Typically, the home location register (HLR) receives the signature. Stepping to block 530, the signature is authenticated. The signature is authenticated by comparing the identity of the MN to the signature received. Transitioning to decision block 540, a determination is made as to whether the signature is authentic. When the signature is not authentic, the process flows to block 537 where the authentication process is ended. The process then steps to an end block and returns to processing other actions. When the signature is authentic, the process flows to block 545 where the AAAH prepares its own signature. Moving to block 550, the AAAH sends the signature to the AAAF associated with the MN. Next, at block 555, the AAAF forwards the signature to the MN for authentication. Transitioning to block 560, the MN authenticates the signature prepared by AAAH. Moving to decision block 565, the process determines when the signature is authentic. When the signature is not authentic, the process moves to block 537 where the authentication process is terminated. The process then steps to an end block and returns to processing other actions. When the signature is authentic, the process moves to block 570 at which point a strong authentication has occurred. A strong authentication occurs when the MN to the network is authenticated and when the network to the MN is authenticated. In other words, strong authentication is achieved when the signature created by the MN is authenticated by the AAAH and when the signature created by the AAAH is authenticated by the MN. The process then transitions to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended and their equivalents.

What is claimed is:

1. A method, comprising:
   sending a random number to a mobile node, wherein the random number is generated local to the mobile node, wherein the random number is generated by a base station;
   generating a mobile node signature using the mobile node, wherein the mobile node signature is generated using the random number;
   authenticating the mobile node to a network, wherein the network is a general packet radio service network; and authenticating the network to the mobile node,
   wherein the authenticating the mobile node to the network and the authenticating the network to the mobile node is performed in a single round trip while the mobile node is roaming.

2. The method of claim 1, wherein authenticating the mobile node to the network, further comprises
   sending the mobile node signature to an authentication server, and
   verifying, by the authentication server, the mobile node signature.

3. The method of claim 1, wherein authenticating the network to the mobile node, further comprises
   generating an authentication signature by the authentication server; and
   sending the authentication signature to the mobile node.

4. The method of claim 3, further comprising:
   verifying, by the mobile node, the authentication signature.

5. The method of claim 1, wherein the authentication server is a home authentication server.

6. The method of claim 5, wherein sending the mobile node signature to the home authentication server, further comprises
   sending the mobile node signature to a local authentication server, wherein local authentication server is located in a foreign domain and forwards the signature to the home authentication server.

7. The method of claim 6, further comprising:
   determining when the mobile node signature is not verified, and when the mobile node signature is not verified ending the strong authentication.

8. The method of claim 7, further comprising
   determining when the authentication signature is not verified, and when the authentication signature is not verified ending the strong authentication.

9. A system, comprising:
   a mobile node that is configured to generate a mobile node signature in response to a random number received from a source within a domain local to a current position relating to the mobile node and send the mobile node signature to be verified, wherein the random number is generated by a base station;
   the authentication server located within a home domain associated with the mobile node that is configured to receive the mobile node signature, verify the mobile node signature, and in response to the verification of the mobile node signature that indicates that the mobile node is verified to a network, wherein the network is a general packet radio service network, return an authentication signature to the mobile node,
   wherein the verification of the mobile node by the authentication server and verification of the authentication signature by the mobile node is performed in a single round trip while the mobile node is roaming.

10. The system of claim 9, wherein the source comprises the base station, wherein the base station is within the domain local to the mobile node and is configured to generate the random number and send the random number to the mobile node.

11. The system of claim 10, wherein the mobile node is configured to verify the authentication signature, and, when the authentication signature is verified, to authenticate the network to the mobile node.

12. The system of claim 9, wherein the mobile node is configured to verify the authentication signature, and, when the authentication signature is verified, to authenticate the network to the mobile node.

13. The system of claim 9, wherein the authentication server is a home authentication server.

14. The system of claim 13, wherein the mobile node is configured to send the mobile node signature to a local authentication server, and the local authentication server is configured to forward the signature to the home authentication server.

15. The system of claim 14, wherein the home authentication server is further configured to send the authentication signature to the local authentication server, wherein the local authentication server is configured to send the authentication signature to the mobile node.

16. The system of claim 15, wherein the home authentication server is further configured to determine when the mobile node signature is not verified, and, when the mobile node signature is not verified, to end the strong authentication.

17. The system of claim 16, wherein the mobile node is further configured to determine when the authentication signature is not verified, and, when the authentication signature is not verified, to end the strong authentication.

18. A system, comprising:
   a base station for generating a random number local to the mobile node;
   a means for sending the random number to the mobile node
   a means for generating a mobile node signature using the mobile node, wherein the mobile node signature is generated using the random number;
   a means for sending the mobile node signature to an authentication server within a general packet radio service network, and
   verifying by the authentication the mobile node signature; and in response to the verifying, generating an authentication signature and sending the authentication signature to the mobile node for verification,
   wherein the verification of the mobile node by the authentication server and verification of the authentication signature by the mobile node is performed in a single round trip while the mobile node is roaming.

19. A base station, comprising:
   a random number generation unit configured to generate a random number;
   a transmission unit configured to send the random number to a mobile node that is roaming and is connected to the base station;
   a reception unit configured to receive a mobile node signature generated by the mobile node using the random number;
   an authentication unit configured to authenticate the mobile node to a network by communicating with an authentication server, wherein the network is a general packet radio service network; and
   a provision unit configured to provide an authentication signature to the mobile node,
   wherein the authenticating the mobile node to the network and the providing the authentication signature to the mobile node is performed in a single round trip.

20. A base station, comprising:
   random number generation means for generating a random number;
   transmission means for sending the random number to a mobile node that is roaming and is connected to the base station;
   reception means for receiving a mobile node signature generated by the mobile node using the random number;

authentication means for authenticating the mobile node to a network by communicating with an authentication server, wherein the network is a general packet radio service network; and provision means for providing an authentication signature to the mobile node, wherein the authenticating the mobile node to the network and the providing the authentication signature to the mobile node is performed in a single round trip.

* * * * *